United States Patent

[11] 3,609,325

[72] Inventors John R. McCarty
Akron;
John A. Guldan, Hudson, both of Ohio
[21] Appl. No. 829,043
[22] Filed May 29, 1969
[45] Patented Sept. 28, 1971
[73] Assignee The Firestone Tire & Rubber Company
Akron, Ohio

[54] SYNCHRONIZED AVERAGING SYSTEM FOR BETA GAUGE CONTROL OF CALENDER SYSTEMS
16 Claims, 6 Drawing Figs.

[52] U.S. Cl. .................................................. 235/151.35,
235/183, 250/83.3 D
[51] Int. Cl. .................................................. G05d 5/02,
G06g 7/18
[50] Field of Search .......................................... 235/151.1,
151.3, 183; 250/83.3; 73/159; 264/40

[56] References Cited
UNITED STATES PATENTS
3,000,438 9/1961 Alexander ..................... 250/83.3 X

| | | | |
|---|---|---|---|
| 3,084,314 | 2/1963 | Ziffer .......................... | 250/83.3 X |
| 3,347,960 | 10/1967 | Fenley ......................... | 264/40 |
| 3,368,007 | 2/1968 | Palmer ......................... | 264/40 |
| 3,378,676 | 4/1968 | Clement ....................... | 235/151.3 |
| 3,474,160 | 10/1969 | Doering ....................... | 264/40 |
| 3,474,668 | 10/1969 | Mangan ........................ | 73/159 |
| 3,508,035 | 4/1970 | Worthley ...................... | 235/151.3 |
| 3,518,430 | 6/1970 | Davis .......................... | 250/83.3 |

Primary Examiner—Eugene G. Botz
Assistant Examiner—Felix D. Gruber
Attorneys—S. M. Clark and Gordon B. Seward ABSTRACT: A system for electronically controlling a physical characteristic of the output sheet material of a calender. A beta gauge is moved laterally across the width of the output sheet at a rate synchronous with the line speed of the calender, and performs average error computations in a plurality of zones of the sheet. The beta gauge error signal, indicating any deviation in the physical characteristic, may actuate a control system to compensate for the error and can induce movement of a recording pen for visual monitoring.

3,609,325

SYNCHRONIZED AVERAGING SYSTEM FOR BETA GAUGE CONTROL OF CALENDER SYSTEMS

BACKGROUND OF THE INVENTION

This invention relates to a system for determining a deviation of a physical characteristic from a desired specification of a calender output sheet material. An average deviation is determined by scanning a beta gauge head over the width of the sheet at a rate synchronous with the calender line speed so that accurate computations are made even if the line speed is varied.

Calendars are used in many industries for sheeting or coating materials such as rubber, plastic, paper, metal or other material which is capable of being compressed through the calender rolls. In the rubber industry, for example, it is critical, not only for economic reasons but also for safety considerations, that the sheets be of substantially the same mass per unit area and subsidiarily thickness over the entire area. This is true regardless of whether the calender is sheeting out tread stock for tires or coating the fabric with gum.

Variations in product mass per unit area or thickness can arise due to defects in the symmetry of a calender roll, due to temperature changes of the roll or the material, or due to any number of other factors including the inconsistent nature of the rubber itself. Various types of measuring devices have been employed to detect an error in product thickness such as air gauges or roller gauges. Further, beta gauges are often used, either independently or in conjunction with the thickness-measuring devices, to determine variations in the mass per unit area. Such variations can occur, for example, if the cords of fabric, being coated during the manufacture of tires, are not equally spaced, or if there is moisture on the cords. Other variations in mass per unit area of the sheet are a function of a roll revolution cycle and thus are cyclic or repetitive in nature. These errors are brought about due to the fact that the calender frame is a resilient member and yields to the varying force between the rolls. Thus, a temperature variation in the roll with resultant roll eccentricity results in a cyclic variation of force between the rolls and a subsequent cyclic variation in the mass per unit area produced.

The variations, of course, are not always uniform across the width of the sheet; that is, one edge of the sheet at a point along its length may have too great a mass per unit area while the other edge or another point may be of insufficient mass per unit area. This could quite readily occur when, for example, tire cords are inadvertently bunched along one side of the sheet. It is therefore evident that measurement by one beta gauge at only one point along the width of the sheet would give inadequate representation of the overall characteristics of the sheet material.

Numerous solutions to these problems have been proposed. For example, there have been attempts at providing a plurality of beta gauges across the width of the sheet, each to take a reading at one particular point. This, of course, is inadequate in that precise accuracy could not be obtained short of an infinite number of gauges. Other systems have attempted to scan or move a single beta gauge across the width of the sheet at a fixed speed to determine deviations at various points and then average these deviations to arrive at a numerical error for each scan. However, such systems have proved inadequate not only because of the fact that a single correction signal is insufficient where there are vast deviation differences across the width of the sheet, but also because of the fact that many errors, as described above, are cyclic in nature in that they have an incidence and duration related to the roll repetition rate of the calender. Therefore, as long as the time interval of the scan of the beta gauge is fixed, its relationship to the cyclic rate of the roll may often be asynchronous, thereby inducing an error in the average error computation. A change in calender speed only compounds the errors in the average computation.

SUMMARY OF THE INVENTION

It is therefore a primary object of the present invention to provide a device which will automatically determine product deviations over a wide range of calender speeds. It is another object of the present invention to provide a device, as above, which performs an average error computation of the mass per unit area of material being produced without being affected by variations in line speed. It is still another object of the present invention to provide a device, as above, which moves laterally across the width of the output material at a rate synchronous with the speed of the calender.

It is a further object of the present invention to provide a device, as above, capable of actuating an error-correction system in order to minimize material produced differing from the desired specification. These and other objects, which will become apparent from the following specification, are accomplished by means hereinafter described and claimed.

In general, a device constructed according to the concept of the present invention consists of a beta gauge, which provides a signal proportional to the magnitude of any error sensed as it scans across the width of the output sheet, which sheet is divided into a plurality of measurement zones. This signal is impressed upon a voltage divider whose division ratio is directly proportional to line speed. The output of this voltage divider is connected to an integrator for a length of time equal to the time during which the beta gauge is passing over the zone being measured. At the completion of the zone, the output of the integrator is stored in a memory circuit and from there is transferred to a recording pen which displays the average error for that zone. The error is also transmitted to a control system which provides appropriate correction for that zone. Immediately after the integrator has transmitted the error in one zone to the memory circuit, it begins integration of the error in the next zone and the sequence continues.

The time interval during which a zone measurement is made is controlled by a circuit consisting of a tachometer generator coupled to the calender and connected to a waveform generator. This generator provides a triangular waveform having a slope proportional to calender speed with internal switching that inverts the polarity of the tachometer signal at the midpoint of the outside zones. The triangular voltage signal is the position command for the beta gauge. Zone transition points can be detected by switching logic so as to create three zones equal in scan time duration and synchronized with the roll repetition rate.

DESCRIPTION OF THE PREFERRED EMBODIMENT

Figure 1:
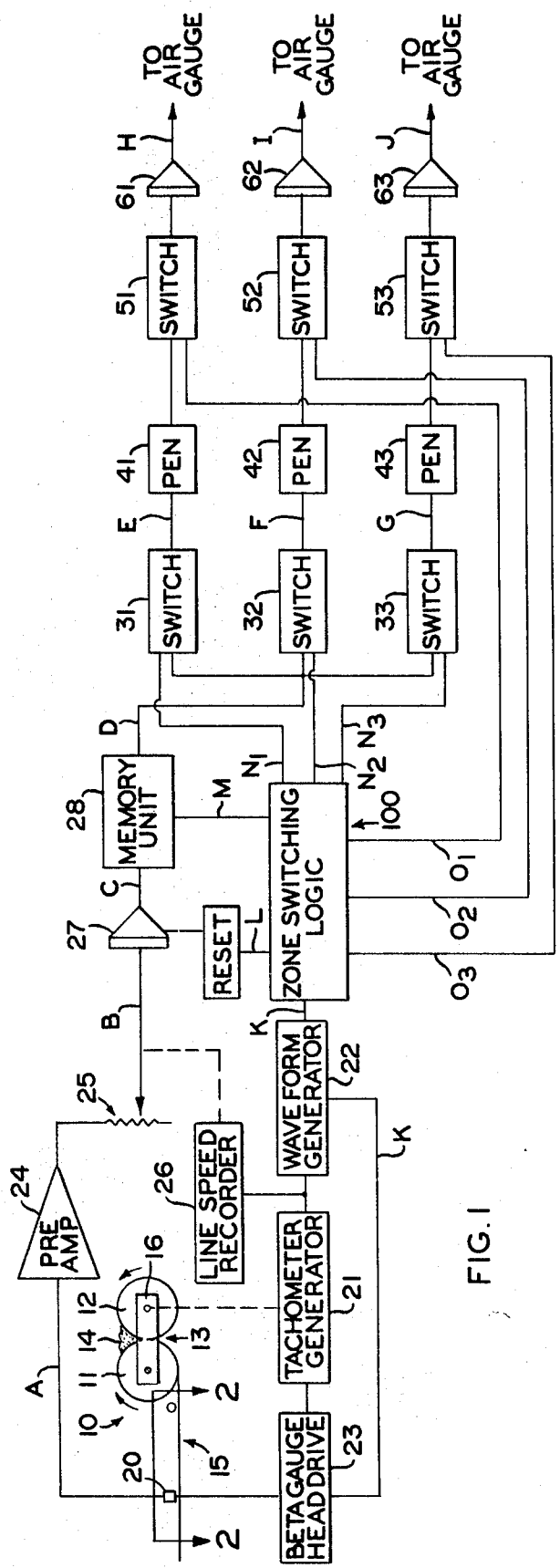
FIG. 1 is a block schematic diagram of a synchronized averaging system embodying the principles of the present invention.

A calender device, with which the synchronized averaging system according to the concept of the present invention may be employed, is indicated generally by numeral 10 in FIG. 1.

The calender 10, as shown, has rolls 11 and 12 which rotate in opposite directions as indicated by the arrows. The rolls 11 and 12 are positioned proximate to each other so as to form a bite, generally indicated by the numeral 13, into which is fed a bank of material 14, such as rubber gum stock. While it is to be understood that this invention is equally applicable in the manufacture of sheets, films or coatings of materials such as plastic, paper, metals and the like, the discussion herein will use rubber as an exemplary material. The bank of material 14 is fed through the bite 13 to form a continuous output sheet of material 15, such as tread stock for use in the manufacture of tires. If the calender system is used for coating materials such as tire fabric, usually four calender rolls are employed which work together to coat both sides of the material. The subject matter of the system disclosed herein is equally applicable to any of these types of calendering devices.

In order to regulate the size of bite 13 and therefore the thickness of sheet 15, calender roll 12 is mounted with a bearing box 16 at each end thereof, so that both ends of roll 12 can be moved toward or away from roll 11 by either screwdown devices, hydraulic cylinders, or comparable control devices.

Figure 2:
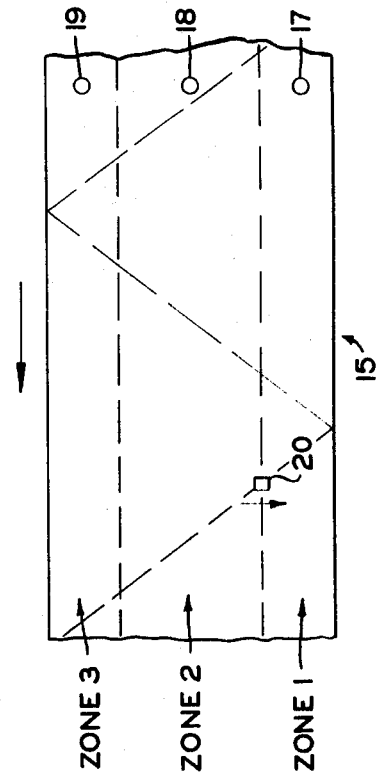
FIG. 2 is a top plan view of a section of the output sheet material.

As is shown in FIG. 2, the sheet of output material may be hypothetically divided into three zones, zones 1 and 3 being on the outside of the sheet and each comprising one-fourth of the width of the sheet, and zone 2 being in the center and comprising the other half of the sheet. Three air gauges 17, 18 and 19 may be employed to monitor the thickness in zone 1, zone 2, and zone 3, respectively. A deviation-sensing means such as a beta gauge 20 is provided to monitor sheet 15 and is motorized to scan the sheet taking readings in each zone. As will hereinafter be more fully explained, the movement of the beta gauge 20 follows a triangular path on the output sheet 15 as shown by the dotted line in FIG. 2. As shown, beta gauge 20 is in a position just leaving zone 2 and entering zone 1, and travels from this point to the edge of the sheet in zone 1 and then reverses itself traveling through zone 1 again and then through zone 2 and zone 3. Upon reaching the edge of the sheet in zone 3, beta gauge 20 again reverses itself and scans zone 3 again. By the time gauge 20 reaches the junction of zones 2 and 3, it has spent the same amount of time reading in each zone, this due to the fact that zones 1 and 3 are one-half the size of zone 2 and that the speed of gauge 20 has remained constant. The electronics of the system to be hereinafter described can be set so that, as the gauge 20 continues back to its starting point depicted in FIG. 2 traveling through zone 2 from zone 3, no readings will be made in zone 2. Readings will again be taken when zone 1 is reached and the entire cycle is repeated. The result is that one cycle of the beta gauge, from the point shown in FIG. 2 back to that point, monitors each zone for the same amount of time.

This movement of gauge 20 across sheet 15 can be made synchronous with line speed by a control system including tachometer generator 21 coupled to calender roll 12 to provide a voltage, which is proportional to line speed, and, a waveform generator 22. An integrator within the waveform generator 22 in conjunction with internal switching circuits causes the polarity of the tachometer signal applied to the integrator to be inverted at the midpoint of travel in zones 1 and 3 (each edge of sheet 15) thus generating a triangular voltage signal, as seen in graph K of FIG. 5. The absolute value slope of waveform K is proportional to line speed because of the connection of the tachometer generator 21 to the waveform generator 22. The dotted waveform shown in graph K conforms to a faster speed $V_2$. Note, however, that the magnitude at the peak of the dotted waveform is the same as the solid-line waveform but advanced in time because of faster speed, that faster speed having also shortened the scan time duration within each zone as indicated by the dotted vertical lines labeled $V_2$.

Figure 5:
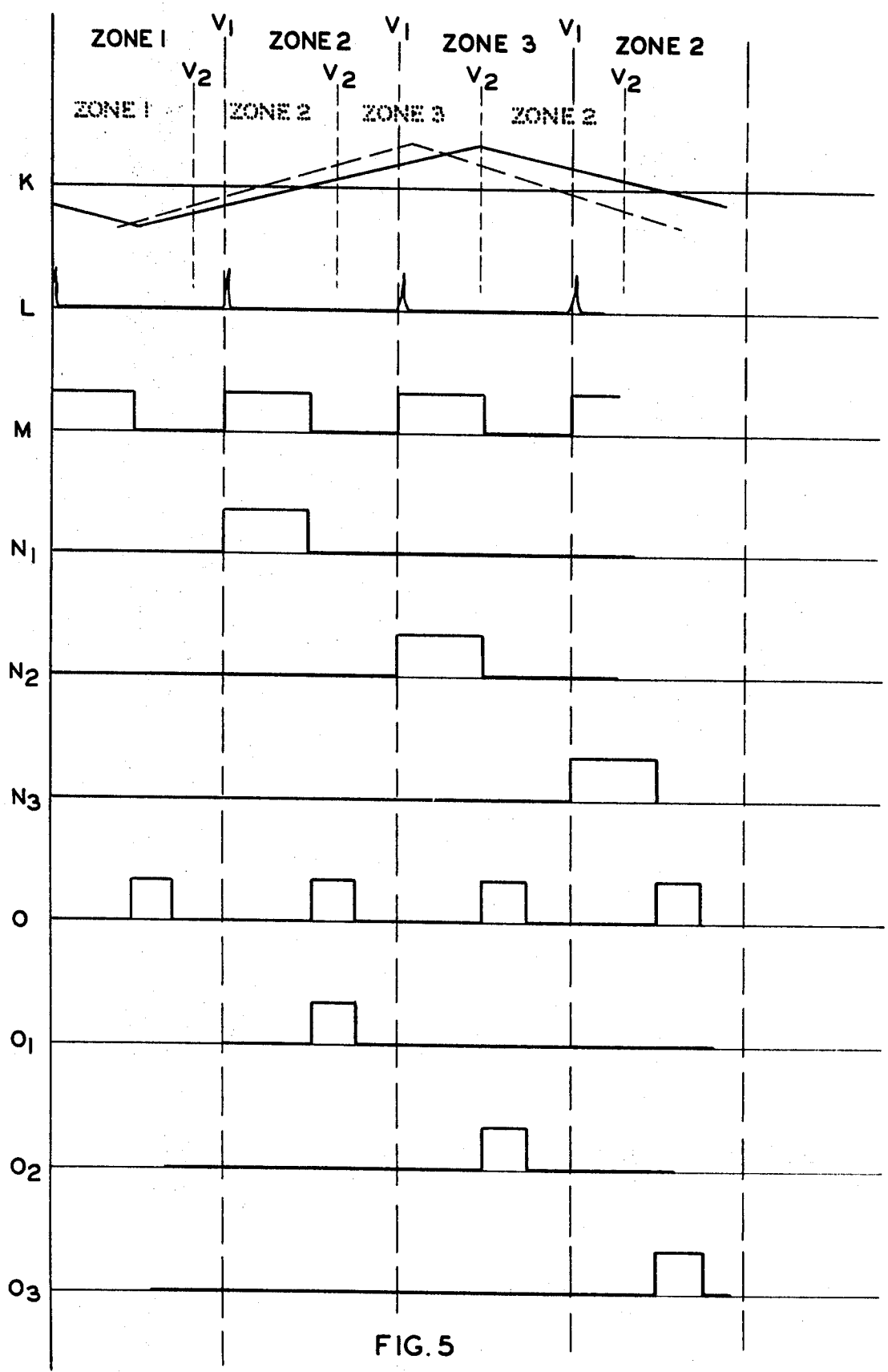
FIG. 5 is another series of waveforms located at various points delineated in FIGS. 1 and 3 and showing the voltage amplitudes along a time scale divided into measurement zones the size of which is dependent on velocity of the calender.

The waveform generator 22 also controls the beta gauge head drive 23 which is a servo-controlled positioning system that defines the position of the beta gauge head 20 according to the input signal K. Therefore the rate of traverse of the beta gauge 20 is proportional to line speed. The beginning of graph K in FIG. 5 represents the position of the beta gauge 20 as shown in FIG. 2. When the beta gauge reaches the end of the sheet in zone 1, the inversion in slope of waveform K causes the head drive 23 to reverse the direction of beta gauge travel until the midpoint of zone 3 is reached when the direction is again reversed.

Figure 4:
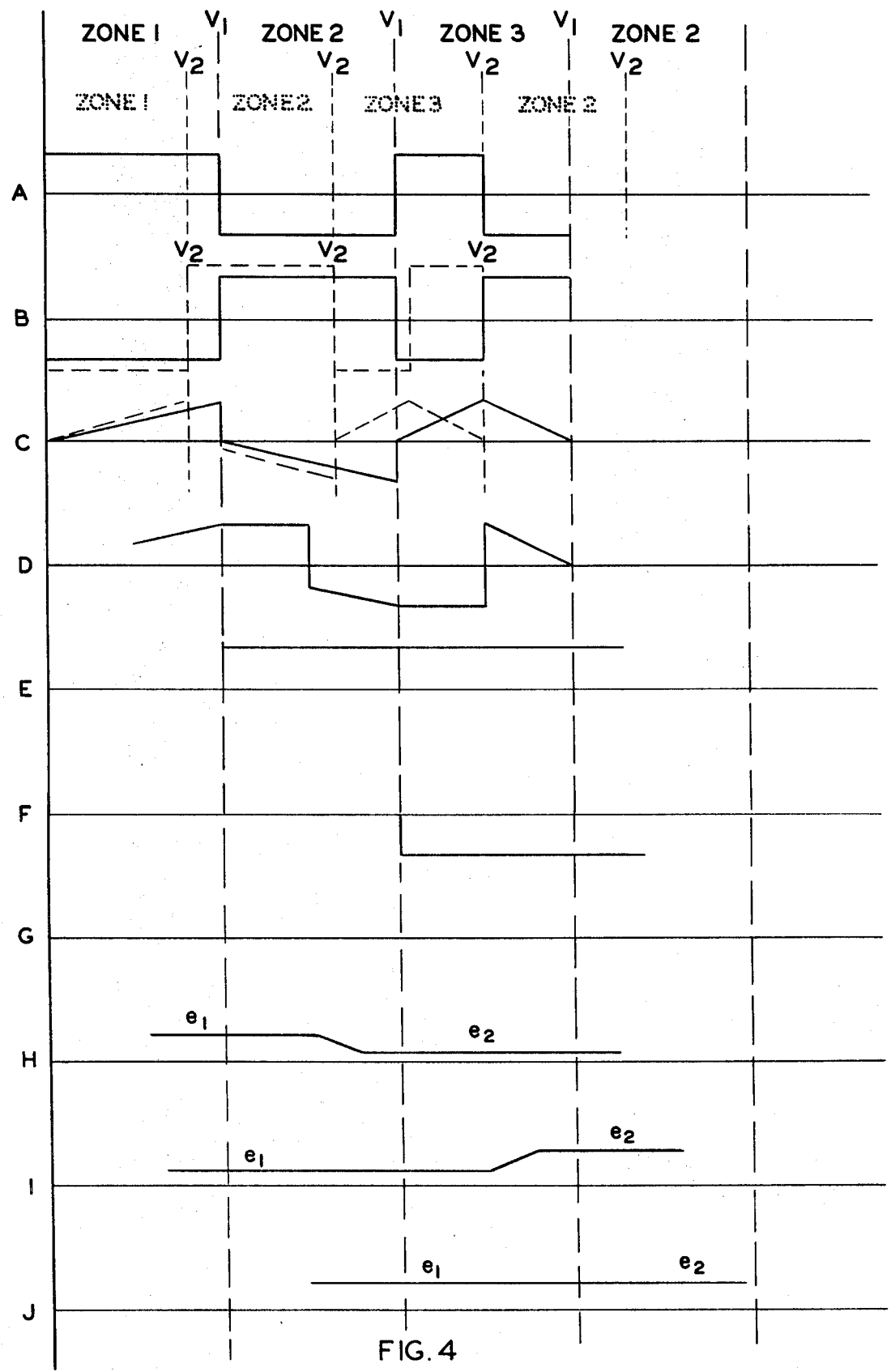
FIG. 4 is a series of waveforms located at various points delineated in FIG. 1 and showing the voltage amplitudes along a time scale divided into measurement zones the size of which is dependent on velocity of the calender.
Figure 6:
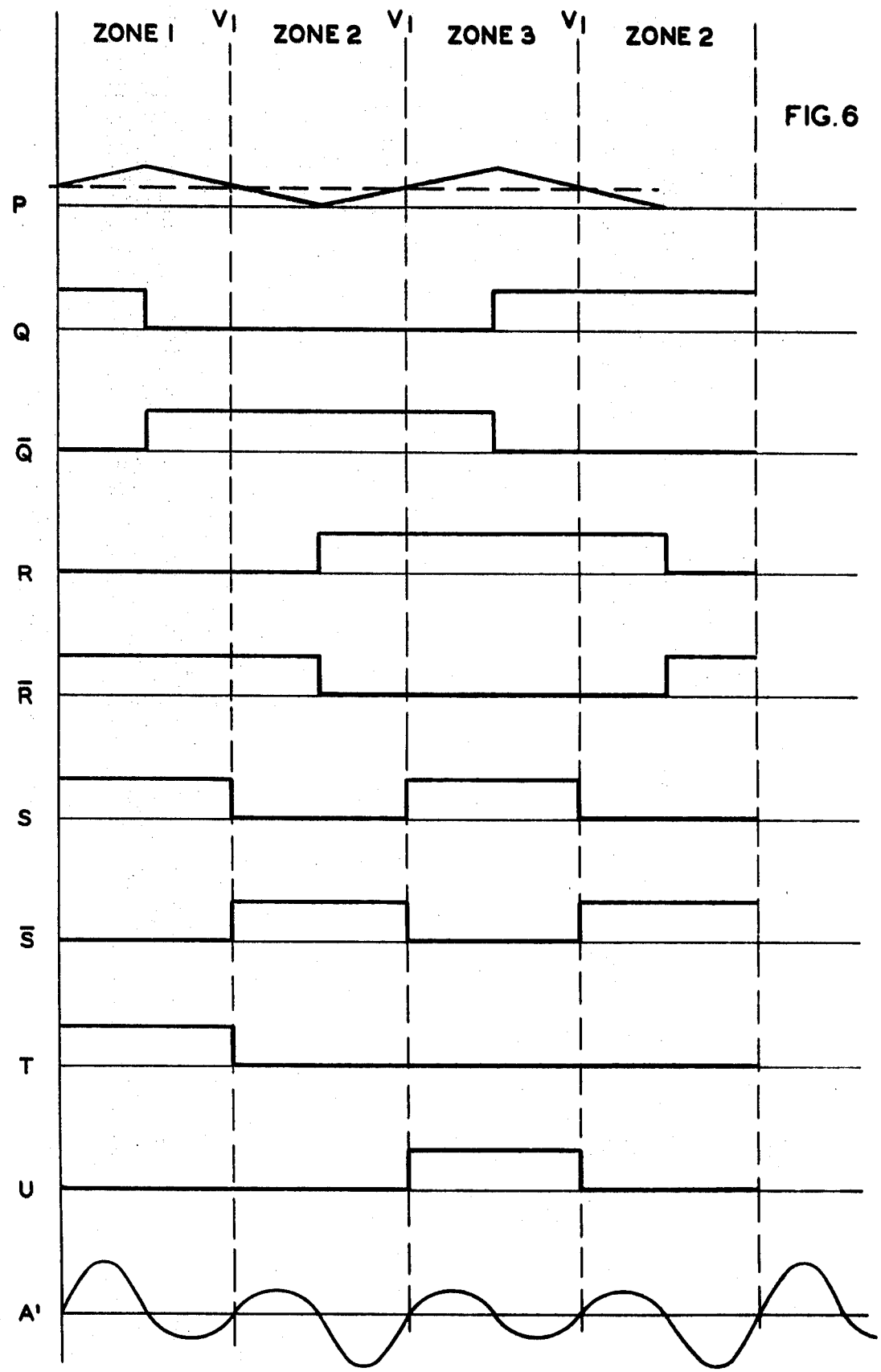
FIG. 6 is a further series of waveforms located at various points delineated in FIG. 3 and showing the voltage amplitudes along a time scale divided into measurement zones the size of which is dependent on the velocity of the calender.

At any time during its travel that the beta gauge 20 senses an error in the mass of material being produced, a deviation signal, such as that shown in waveform A in FIG. 4 is produced. This error in mass per unit area is independent of any error in thickness that the air gauges may be reading. The waveform A indicates that a constant positive error exists in zone 1, a constant negative error exists in zone 2, and a constant positive error exists in the first half and negative error in the second half of zone 3. For purposes of this description, a positive error is one designated as indicating that the material is too heavy. A constant error throughout a zone would be the exception rather than the rule, the error being shown as constant in graph A of FIG. 4 to simplify this description. A more typical error is shown at the bottom of FIG. 6 labeled graph A'. Here an irregular error is shown which is cyclic, that is, repeats itself for each cycle in each zone. It should be evident from such an irregular wave form that if the scan interval of the beta gauge was asynchronous, as in the prior art, the average computations would be erroneous. It is this error which the electronic structure of this invention eliminates.

The deviation signal such as waveform A is fed to an amplifier 24 which, due to the electronic arrangement chosen for this description, inverts the polarity of the waveform. This signal is then impressed upon a multiplying device which can be a voltage divider or slidewire potentiometer 25 whose division ratio is made directly proportional to line speed due to the fact that the sliding contact on the slidewire is mechanically connected and positioned by a line-speed recorder 26 coupled to the tachometer generator 21. The voltage output from potentiometer 25 is therefore determined by the product of the inverted waveform A and the line speed. The resultant waveform is shown in FIG. 4 as graph B. The relative magnitudes of graphs A and B are not intended to be precise depictions and, in fact, are shown to be the same merely for purposes of facile description. However, the dotted waveform of graph B indicates a faster speed conforming to the dotted waveform K. This increase in speed is shown by the greater magnitude of the dotted waveform B. It is also evident that the faster speed $V_2$ causes the beta gauge 20 to scan each zone in a shorter time, therefore compressing the dotted waveform B and the time duration in each zone along the horizontal axis.

The signal of waveform B from potentiometer 25 is fed to an integrator 27 for a time precisely equal to the beta gauge scan time in one zone. The output of integrator 27 is shown in graph C as being a positive ramp for positive errors and a negative ramp for negative errors, the final amplitude at the end of each zone indicating the average error for each zone. The net error in zone 3 is zero since, for the example shown in graph A, the positive and negative errors of the same magnitude and time duration, in effect, cancel each other out.

At the faster velocity $V_2$, the integrator output is of the same magnitude, since the error signal is the same, only the speed having increased. Since the slidewire of potentiometer 25 is mechanically connected to the line speed recorder 26, at the faster speed $V_2$ the output of the potentiometer is greater. This speed increase causes the integrator 27 to reach its end value in a shorter time interval proportional to the increase in the speed of the calender but for a proportionally shorter period of time, thus maintaining the same average error regardless of the speed.

Figure 3:
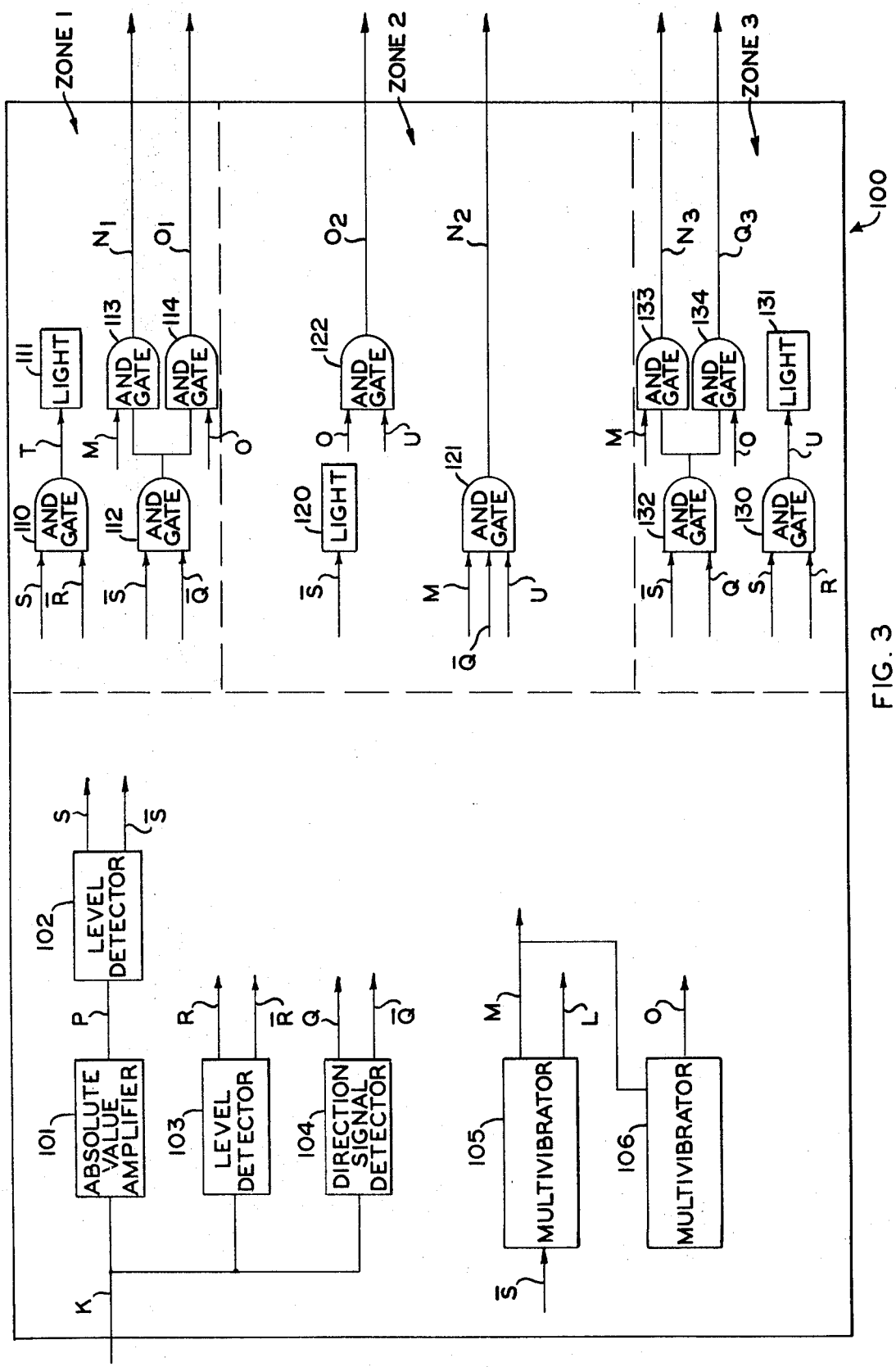
FIG. 3 is a block schematic diagram of the zone switching logic depicted in FIG. 1, according to the present invention.

The signal C is received by a standard memory unit 28 often called track-and-hold circuitry which, when turned on, follows the path of the integrator until the end of a zone is reached, at which time the output of the integrator is stored. The corresponding output is indicated by waveform D which shows that the memory unit 28 was activated at a time approximately in the middle of each zone. From that time on, graph D reflects the fact that the memory unit followed the integrator output (graph C) until the end of a zone. The constant portion of graph D at the beginning of each zone indicates that point in time at which the memory unit is storing the previous zone's error. When turned on again, as at the midpoint of zone 2, for example, the stored error from zone 1 is cleared and graph D follows the integrator through zone 2 until the end thereof when the output is again stored. This process is repeated through each zone, the timing of which is controlled by an electronic zone-switching logic system, indicated generally by the numeral 100 and shown in detail in FIG. 3, to be hereinafter described. The zone-switching logic system 100 also provides a voltage spike to operate a relay at the beginning of each zone to reset the integrator 27. Graph L of FIG. 5 shows such a spike.

The error signal from the memory unit 28, graph D, is supplied to three switches 31, 32 and 33 which, in turn, actuate the recording pens 41, 42 and 43 for zones 1, 2 and 3, respectively. The time when each pen is to record is controlled by the zone-switching logic 100 as shown by graphs $N_1$, $N_2$ and $N_3$, to be described hereinafter in more detail. In brief, switches 31, 32 and 33 will close upon a signal from connections $N_1$, $N_2$ and $N_3$ which provides error signals E, F and G to pens 41, 42 and 43, respectively. Graphs E, F and G represent the magnitude of the errors in zones 1, 2, and 3, respectively, which moves the pens 41, 42, and 43.

The voltages E, F, and G are maintained on repeater slidewires in each pen 41, 42 and 43, so that the voltage may be held by the recording pen position while the memory unit is storing the error of the next zone. Thus the graphs E, F, and G also represent that error signal which is maintained by the position of the recording pen and which is supplied through switches 51, 52 and 53, to integrators 61, 62 and 63. The waveforms $O_1$, $O_2$ and $O_3$ from the electronic zone switching logic 100 control the time when each switch 51, 52 and 53 is closed. As shown by the waveforms H, I and J, these integrators act as the error signal for a short period of time, their output going from a previous correction signal, indicated by $e_1$ to a new signal $e_2$. This integration takes place during the time in which the beta gauge 20 is reading the error in the next succeeding zone. Therefore the transition from $e_1$ to $e_2$ in waveform H for zone 1 correction, for example, is during the zone 2 time period, Since the net error in zone 3 was zero, $e_1$ equals $e_2$ in waveform J.

The correction signals H, I and J are supplied to actuate some type of control system to compensate for the error in mass per unit area. In the preferred embodiment of the present invention, it is contemplated that the correction signals would be utilized to change the set points of air gauges 17, 18 and 19.

Summarily, in tracing an error through the zone 1 circuitry, graph A indicates a positive error (too great a mass) in the material in zone 1. The polarity of graph A is inverted by amplifier 24 and multiplied by the line speed in a voltage divider 25. The output (graph B) is then integrated with a positive ramp (graph C) being fed to the memory unit 28. When the waveform M produced by the zone switching logic 100 goes to zero, the memory unit 28 follows the output C of the integrator. Thus, in the middle of zone 1, the memory unit, graph D, begins to pick up the output from the integrator 27. When the waveform M goes positive again, as at the beginning of zone 2, the memory unit 28 stores the zone 1 error as shown by the constant value of graph D at this point. At this same time, signal $N_1$ from the electronic zone-switching logic 100 closes switch 31 and the average error stored in the memory unit shown in graph D is recorded and displayed by pen 41 (graph E). This pen will continue to show that error until a new zone error is determined.

The voltage signal from pen 41 is fed to an integrator 61 when waveform $0_1$ is positive closing switch 51. As shown, this occurs, in this example, at about the middle of the next zone, zone 2. Assuming that the integrator 61 as been carrying a voltage $e_1$ from past corrections, this new zone 1 error will cause the integrator to put out a new correction signal $e_2$, shown in graph H, to the air gauge 17. This cycle is repeated for each zone in a continuous manner.

Turning now to the zone-switching logic 100, it is the function thereof to sequentially command the above-described system to coordinate its operations. In general, the zone-switching circuitry must be able to determine which zone the beta gauge 20 is currently reading or scanning and also which zone has just been completed by the beta gauge, since the controlling of the error is performed immediately after the beta gauge has completed reading the error in a certain zone.

The triangular voltage wave K from the waveform generator 22 is the sole input to the switching logic 100. The waveform K is fed into a standard absolute value amplifier 101 which, as is well-known in the art, converts a waveform with positive and negative values, such as K, into its absolute form, that is, one having all positive values. Such a waveform, shown in graph P, is fed to a standard level detector 102 which provides, as an output, two gates, the S gate and the $\bar{S}$ gate (the "not S" gate). The $\bar{S}$ gate is positive at all times the S gate is zero, and zero when the S gate is positive. The S gate, as shown in FIG. 6, is generated by the level detector 102 at the times when the waveform P is above a certain point. That point is indicated by the horizontal dotted line in graph P. The level detector 102 is therefore set so that the S gate will be generated when the beta gauge is in zones 1 and 3. The $\bar{S}$ gate, being the mere reciprocal of the S gate, is generated when the P waveform is below that point indicated by the dotted line on graph P. Thus the terminology "not S" is given to the $\bar{S}$ gate since it is operative in zone 2 at the times when the S gate is not.

The K waveform is also fed to a standard level detector 103 which generates two more gates, R and $\bar{R}$. The R gate is on for all positive values of the waveform K, while the $\bar{R}$ gate is on when the waveform K is negative. Similarly, the signal K from the waveform generator 22 is fed to a standard direction signal amplifier or detector 104. This device provides a Q gate when the slope of the K waveform is negative. Conversely, the $\bar{Q}$ gate is generated when the slope of the waveform K is positive.

As will hereinafter become evident, the above-described gates are employed internally of the zone-switching logic system 100 to generate the gates or waveforms L, M, $N_1$, $N_2$, $N_3$, $0_1$, $0_2$, and $0_3$ previously described. For example, the $\bar{S}$ gate is fed into a standard multivibrator 105 which is capable of identifying the transition points or "on" and "off" points of the $\bar{S}$ wave and generates an M gate whose duration can be preselected and set into the multivibrator 105. Thus the M gate shown is generated at the beginning of each zone and is set to last for approximately one-half of each zone.

The M gate carries out three functions in the circuitry shown in FIG. 1. First, it commands the memory unit 28 to hold waveform C at a particular point, that is, it disconnects the memory unit 28 from the integrator 27 and stores the last reading. This is reflected in waveform D by the constant value at the beginning of each zone indicating that the memory unit 28 has stored its current reading from the previous zone. Second, it is fed to another multivibrator 106 which generates a correction gate 0 at the end of each M gate. The duration of the O gate is determined by a preselected setting of the multivibrator 106 and is shown in FIG. 5 as lasting approximately one-fourth of a zone-duration time. This setting is determined by system stability requirements and is the same for all zones. The O gate is combined with other gates, to be hereinafter described, to generate the $0_1$, $0_2$ and $0_3$ waveforms. Finally, the M gate also serves as an intermediate gate with other gates within the zone-switching logic 100. This function also will be hereinafter explained in detail.

The multivibrator 105 further drives a relay (not shown) which generates, at the leading edge of the M gate, an integrator reset gate, shown as the waveform L. It is critical that this gate be generated a very short time after the start of each memory disconnect gate M, and be of very short duration.

Thus, the voltage spike shown at L serves to reset the integrator 27, as shown in waveform C, at the transition points between zones.

That portion of the zone-switching logic 100 which controls zone 1 will now be described in detail. The S gate and the $\bar{R}$ gate are supplied to an AND gate 110 which, as is well-known in the art, will generate a pulse only during the occurrence of two or more other pulses. At the point in time that both the S gate and $\bar{R}$ gate are generated, the beta gauge 20 is scanning zone 1 and waveform T is generated. The T waveform can be used to control a light 111 in the control panel so that the operator will know when zone 1 is being scanned.

As previously described, the pen 41 runs after the beta gauge has completed its scan of zone 1 and entered zone 2. Similarly, the integrator 61 will not be actuated until the beta gauge has passed from zone 1 to zone 2. Therefore, it is important to know when in point of time that event has occurred. To this end the combination of the $\bar{S}$ gate and the $\bar{Q}$ gate is supplied to an AND gate 112 which indicates that the beta gauge 20 has just left zone 1 and entered zone 2. This combination of signals is supplied to an AND gate 113 which is on when combined with the M gate. Thus, in effect, it is the total combination of the $\bar{S}$, $\bar{Q}$, and M gates which provides an $N_1$ waveform generated during the first half of zone 2. This allows the waveform D to be transferred to the recording pen 41 through switch 31 in the form of signal E.

The signal from AND gate 112 is also supplied to AND GATE 114 which, upon combination with waveform O, will supply the waveform $O_1$ to close switch 51. This occurs at the beginning of the second half of the scan of zone 2 and allows the signal from pen 41 to activate the integrator 61 to provide a correction signal to compensate for the error found to exist in zone 1.

The controlling and correction of zone 3 will next be described, it being substantially the same as that of zone 1 just discussed. The combination of the S gate and the R gate generates, through the AND gate 130, the U waveform gate which indicates that the beta gauge 20 is scanning zone 3. The U waveform can be supplied to actuate a control panel light 131 which indicates to the operator that zone 3 is being scanned.

The recording pen 43 and the integrator 63 are to be activated to record and provide an error correction signal for zone 3 after the beta gauge has left zone 3 and reentered zone 2. It is thus important to determine that point in time when the above-described beta gauge movement has occurred. Since the $\bar{S}$ gate signifies that the beta gauge 20 is in zone 3 and since the Q gate indicates that the beta gauge is traveling toward zone 1 from zone 3, these two gates are supplied to AND gate 132 which generates a pulse which, when combined with the M gate in AND gate 133, generates the waveform $N_3$ that closes switch 33 so that pen 43 records the waveform G. The pulse from AND gate 133 is also supplied to AND gate 134 to be combined with waveform O to trigger AND gate 134. This provides the waveform $O_3$ to close switch 53 which begins the integration of the error through integrator 63 which provides a zone 3 error correction signal.

Turning now to the control and correction of zone 2 error, when the level detector 102 generates the S gate, this is an indication that the beta gauge is monitoring zone 2 and the light 120 comes on to demonstrate this fact to the operator.

It is recalled that during one complete cycle of the beta gauge from the point shown in FIG. 2 back to that point, the beta gauge will transgress zone 2 twice. In the embodiment described, the error is recorded and corrected only during the first time through zone 2, that is, during the time the beta gauge 20 is moving from zone 1 toward zone 3. This is merely a matter of choice, and if desired, one of ordinary skill in the art could adapt the device disclosed herein so that error is recorded and corrected during each scan of zone 2.

Thus, in the embodiment shown, the recording pen 42 and integrator 62 must be actuated at that point in time when the beta gauge 20 leaves zone 2 and enters zone 3. To this end an AND gate 121 is set to generate waveform $N_2$ only upon the combination of the M, U, and Q gates. As the waveform $N_2$ in FIG. 5 indicates, the only time that all three of the above-noted gates are positive is during the first half of zone 3. This signal closes switch 32 which allows the pen 42 to record the waveform F. The combination of the U and O gates is supplied to an AND gate 122 which then generates the $O_2$ waveform which closes switch 52 to correct the error via integrator 62.

It should now be evident that a system for synchronizing average beta gauge correction signals with line speed in a calender device constructed according to the foregoing description will substantially improve the calender control art and otherwise accomplish the objects of the present invention.

We claim:

1. In a calendering device, apparatus providing an error signal responsive to an average deviation from the desired specification of a physical characteristic of a continuous output sheet material comprising, means providing a signal proportional to a determined deviation, means moving said means for providing a signal proportional to a determined deviation laterally across the sheet of material at a speed proportional to the speed of the calendering device, means operating on said signal proportional to a determined deviation and providing an output signal proportional to the speed of the calendering device and to the signal proportional to a determined deviation integrator means for obtaining an average calculation on said output signal, and electronic switching means gating the average calculation of said integrator means to provide the error signal.

2. An apparatus according to claim 1 further including a recording means for displaying the average calculation of said integrator means.

3. An apparatus according to claim 1 further including a memory unit which receives and stores the output of said integrator means.

4. An apparatus according to claim 3 wherein said electronic switching means controls said memory unit so that said memory unit is directed to sequentially receive and store the average calculation from said integrator means.

5. An apparatus according to claim 4 wherein said electronic switching means resets said integrator means so that said integrator means performs a series of average calculations, said memory unit sequentially receiving, storing and then discharging each of said average calculations.

6. An apparatus according to claim 5 further including a plurality of recording means for displaying each said average calculation, said recording means being directed by said memory unit in conjunction with said electronic switching means.

7. An apparatus according to claim 6 wherein at least one of said recording means receives an average calculation while said memory unit is storing said calculation but before said memory unit discharges said average calculation and receives another average calculation.

8. An apparatus according to claim 7 wherein each said recording means includes a repeater slidewire means providing an output to an error-correction integrator means.

9. An apparatus according to claim 8 wherein the output from each said recording means is provided to said error-correction integrator means after said memory unit has discharged the average calculation from said integrator means, said error correction integrator means providing a correction signal to actuate a control system to correct the error from the desired specification.

10. An apparatus according to claim 1 wherein said means moving said means providing a signal proportional to a determined deviation laterally across the sheet of material at a speed proportional to the speed of the calendering device includes a waveform generator means.

11. An apparatus according to claim 10 wherein tachometer generator means provides a signal proportional to the speed of the calendering device to said waveform generator means.

12. An apparatus according to claim 11 wherein the signal from said tachometer generator means is provided to said means operating on said signal proportional to a determined deviation.

13. An apparatus according to claim 10 wherein said waveform generator means provides a triangular waveform, the slope of which is proportional to the speed of the calendering device.

14. An apparatus according to claim 1 wherein said means operating on said signal proportional to a determined deviation is a potentiometer whose sliding contact on the slidewire is positioned proportional to the speed of the calendering device.

15. An apparatus according to claim 5 wherein said electronic switching means comprises multivibrator means to control said memory unit and reset said integrator means.

16. An apparatus according to claim 1 wherein said electronic switching means comprises a plurality of AND gates.

PO-1050
(5/69)

UNITED STATES PATENT OFFICE
CERTIFICATE OF CORRECTION

Patent No. 3,609,325      Dated September 28, 1971

Inventor(s) John R. McCarty and John A. Guldan

It is certified that error appears in the above-identified patent and that said Letters Patent are hereby corrected as shown below:

Col. 7, line 61, "S" should read --$\overline{S}$--

Col. 8, line 2, "Q" should read --$\overline{Q}$--

Line 72 should read --cludes waveform generator means--

Signed and sealed this 11th day of July 1972.

(SEAL)
Attest:

EDWARD M. FLETCHER, JR.       ROBERT GOTTSCHALK
Attesting Officer                Commissioner of Patents